United States Patent [19]

Kedem et al.

[11] Patent Number: 5,005,347
[45] Date of Patent: Apr. 9, 1991

[54] FRUIT PICKING DEVICE

[75] Inventors: Dan Kedem, Weizman; Mordechai Rubinstein, Kaplinsky, both of Israel

[73] Assignees: Du-Kedem Technologies, Ltd., Rehovot; Du-Kedem Projects Ltd., Gan Haim, both of Israel

[21] Appl. No.: 463,726

[22] Filed: Jan. 12, 1990

[51] Int. Cl.⁵ .......................................... A01D 46/24
[52] U.S. Cl. .................................... 56/328.1; 56/332
[58] Field of Search ...................... 56/328.1, 332, 333, 56/335, 336

[56] References Cited

U.S. PATENT DOCUMENTS

| | | | |
|---|---|---|---|
| 2,775,088 | 12/1956 | Bullock | 56/332 |
| 3,460,330 | 8/1969 | Black, Jr. | 56/328.1 |
| 3,564,826 | 2/1971 | Middleton, Jr. | 56/328.1 |
| 3,591,949 | 7/1971 | Connery | 56/332 |
| 3,756,001 | 9/1973 | Macidull | 56/332 X |
| 4,519,193 | 5/1985 | Yoshida et al. | 56/328.1 |
| 4,532,757 | 8/1985 | Tutle | 56/328.1 |
| 4,674,265 | 6/1987 | Gerber | 56/332 |
| 4,718,223 | 1/1988 | Suzuki et al. | 56/328.1 |

Primary Examiner—William P. Neuder
Attorney, Agent, or Firm—Benjamin J. Barish

[57] ABSTRACT

A fruit picking device includes a head for receiving the fruit, a first pair of bails pivotally mounted to the head in spaced relation to each other across the housing opening, a second pair of bails pivotally mounted to the head in spaced relation to each other across the housing opening substantially perpendicularly to the first pair of bails, and cutter blades carried by the latter bails and effective, when the bails are pivoted to their closed positions, to engage and cut the stem of the fruit within the head.

20 Claims, 4 Drawing Sheets

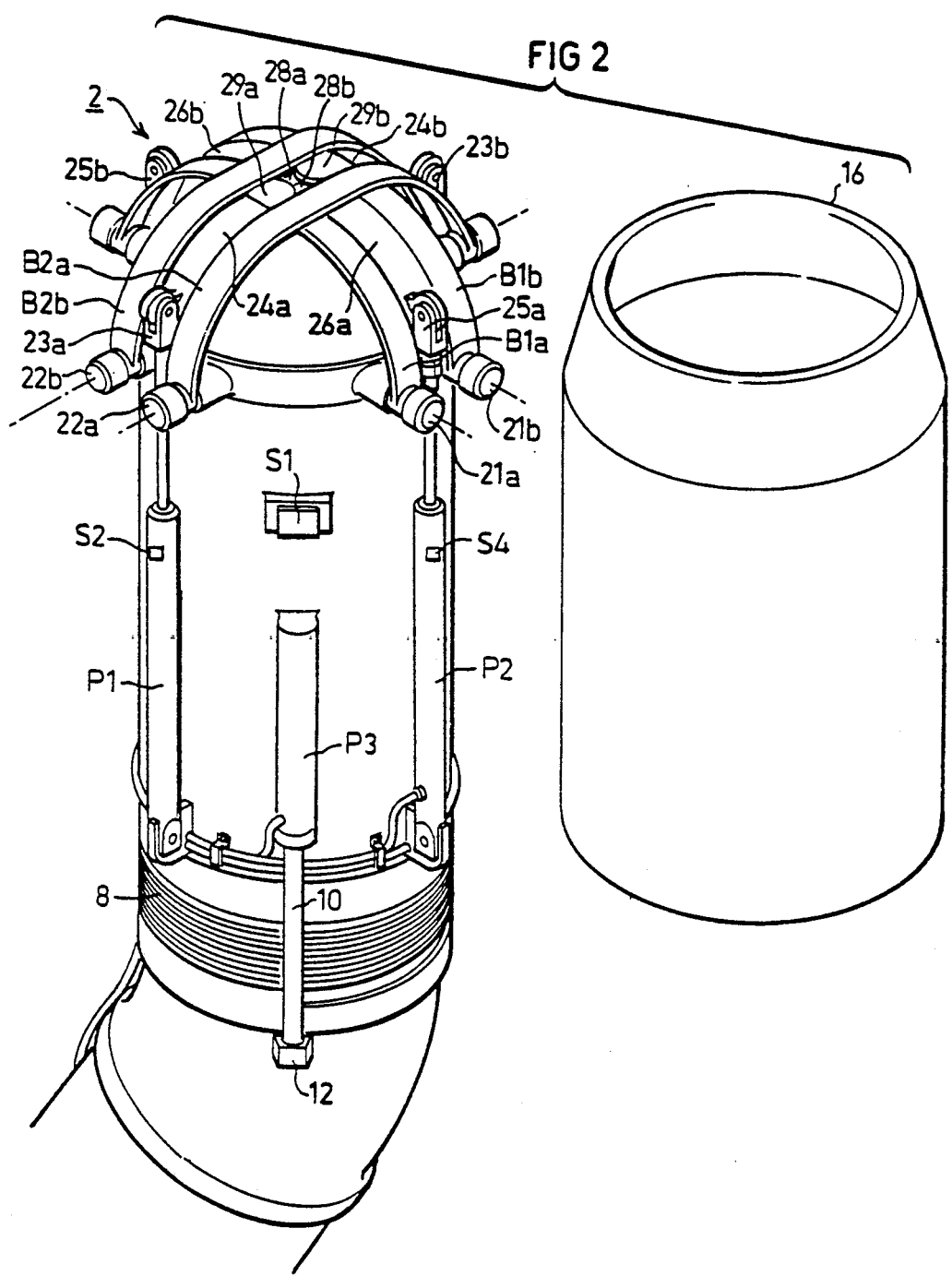

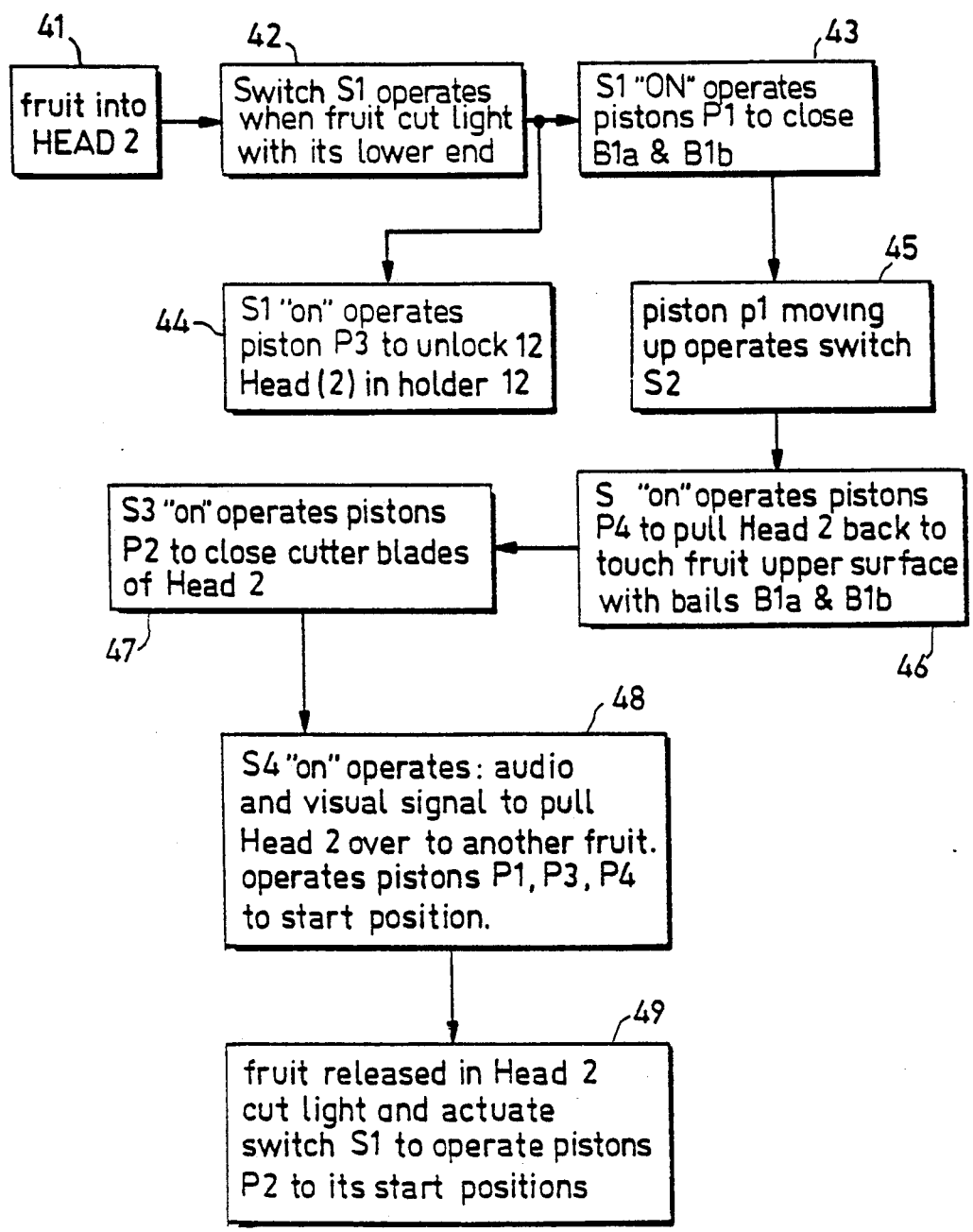
FIG 5 FLOW DIAGRAM

FRUIT PICKING DEVICE

BACKGROUND OF THE INVENTION

The present invention relates to a fruit picking device for picking fruit in a quick and efficient manner. The invention is particularly useful for picking fruit whose stems have to be cut, such as oranges, grapefruits, avocados, mangos, and the like, and is therefore described below with respect to this application, but it will be appreciated that it could be used for many other applications as well.

Oranges and most other fruits are generally picked by hand, which is a slow and tedious operation. Although there have been a number of proposals to mechanize fruit picking, such proposals have generally not found widespread use particularly with respect to fruit whose stems have to be cut.

OBJECTS AND SUMMARY OF THE INVENTION

An object of the present invention is to provide a fruit picking device enabling fruit to be picked in a more efficient manner.

According to the present invention, there is provided a fruit picking device for picking a fruit suspended by a stem from a plant on which the fruit grows. The fruit picking device comprises a head having an opening at one end larger than the fruit to be picked for receiving the fruit; a first pair of bails pivotally mounted to the head in spaced relation to each other across the opening and pivotal from an open position allowing the fruit to enter the head, or to a closed position; and a second pair of bails pivotally mounted to the head in spaced relation to each other across the housing opening substantially perpendicularly to the first pair of bails and also pivotal from an open position allowing the fruit to enter the head, or to a closed position.

According to further features in the described preferred embodiment, the second pair of bails include cutter blades effective, when the latter bails are pivoted to their closed positions, to engage and cut the stem of the fruit within the head.

In order to automate at least part of the operation of the fruit picking device, in the described preferred embodiment the device further includes a first sensor effective, when sensing a fruit in a predetermined position within the head, to actuate the first pair of bails to pivot them from their open positions to their closed positions.

According to further features in the described preferred embodiment, the head is pivotally mounted to a tube, and includes locking means normally locking the head against pivotal movement, but actuatable to release the head for pivotal movement with respect to the tube. Also, the head is pivotally mounted to the tube by a yieldable coupling, preferably a coiled spring, which permits both pivotal and axial movement of the head with respect to the tube. In the described preferred embodiment, the locking device locks the head at an angle of 105-165°, preferably about 135°, with respect to the longitudinal axis of the tube.

According to still further features in the described preferred embodiment, the locking device comprises a locking rod carried by the head receivable in a socket carried by the tube, and a drive for moving the locking rod into the socket to lock the head against pivotal movement with respect to the tube, or out of the socket to release the head for pivotal movement with respect to the tube. The locking device further includes a ball pivotally mounted to the tube and formed with an opening receiving the locking rod and normally permitting the locking rod, and the head secured thereto, to pivot with respect to the tube, the locking means drive being effective to move the locking rod through the ball into the socket to lock the head against pivotal movement with respect to the tube.

In the described preferred embodiment, the first sensor is effective, when sensing a fruit within the head, also to actuate the locking means to its released position to permit pivotting the head with respect to the tube. In addition, the head further includes a drive for the tube for driving it and the head carried thereby to an extended or retracted position. The head further includes a second sensor effective, upon the actuation of the first pair of bails to their closed positions, to actuate the drive to move the tube to its retracted position.

To further automate the device, the described preferred embodiment includes a third sensor effective, when the upper surface of the fruit engages the lower surface of the first pair of bails, to actuate the second pair of bails to their closing positions and to cut the stem of the fruit within the head.

According to a further feature in the described preferred embodiment, the second pair of bails are pivotally mounted to the head at pivot points on opposite side of, and laterally spaced from, the longitudinal axis of the opening through the head, such that the cutting edges of the cutting blades, when pivotted to their closed positions, cut the stem close to the fruit.

As will be more apparent from the description below, a fruit picking device constructed in accordance with the foregoing features may be used for picking fruit, such as oranges, in a rapid and efficient manner. It also permits varying degrees of automation in order to further increase its efficiency and productivity.

Further features and advantages of the invention will be apparent from the description below.

BRIEF DESCRIPTION OF THE DRAWINGS

The invention is herein described, by way of example only, with reference to the accompanying drawings, wherein:

FIG. 2 is an enlarged exploded view particularly illustrating the head in the fruit picking device of FIG. 1;

FIG. 5 is a flow diagram illustrating one mode of operation of the fruit picking device of FIGS. 1-4.

DESCRIPTION OF A PREFERRED EMBODIMENT

Figure 1:
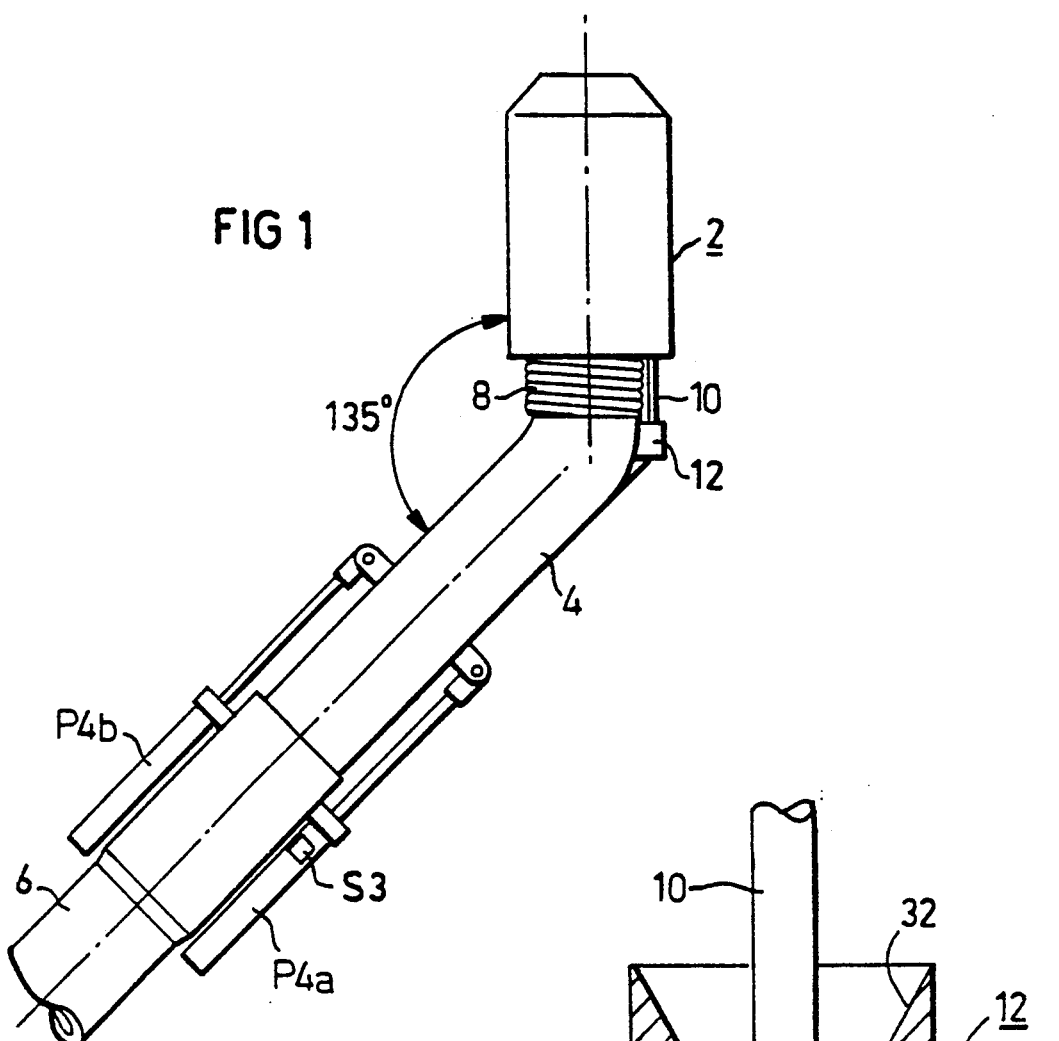
FIG. 1 is a side elevational view illustrating one form of fruit picking device constructed in accordance with the invention.

The fruit picking device illustrated in FIG. 1 comprises a head, generally designated 2, mounted at one end of a tube 4 which is telescopingly received in a second tube 6, permitting tube 4 and the head 2 to be moved to an extended or retracted position. Head 2 is pivotally mounted to tube 4 by a yieldable coupling, in the form of a coiled spring 8, which permits the head to be both pivotted, and also to be moved axially, with respect to its tube 4. Head 2 may be locked in position against pivotal movement by a locking rod 10 carried by head 2, and received within a block 12 carried by the tube.

The fruit picking head 2 is more particularly illustrated in FIG. 2. It includes a housing 14 of cylindrical configuration having a diameter larger than the fruit, e.g., oranges, to be picked by the head. Its upper end is open to receive the fruit, and its lower end is also open to permit the fruit to pass via the two telescoping tubes 4, 6 and a flexible feeding tube (not shown) into a container (not shown) after the fruit has been picked from the tree. Its cylindrical housing 14 is enclosed by an outer cylindrical casing 16 to cover the working parts of the head and to present a neat, smooth outer appearance to the head.

The fruit picking head 2 includes a first pair of bails $B_{1a}$, $B_{1b}$ pivotally mounted to its housing at two pairs of pivot points 21a, 21b, respectively; and a second pair of bails $B_{2a}$, $B_{2b}$, also pivotally mounted to the housing about pivot points 22a, 22b, respectively. All the bails are of generally arced configuration. They may be pivotted either to open positions for enabling the head 2 to receive the fruit to be picked, and then to closed positions, as illustrated in FIG. 2, for cutting the fruit stem, whereupon the fruit falls by gravity via the telescoping tubes 4, 6 to a collection container.

The first pair of bails $B_{1a}$, $B_{1b}$ are pivotted by a pair of piston drives Phd 1, one of which is seen in FIG. 2, carried by the outer face of housing 14; and the other pair of bails $B_{2a}$, $B_{2b}$, are similarly pivotted by a pair of pistons Phd 2, one of which is seen in FIG. 2, carried by the outer face of housing 14. The end of each piston $P_1$ is coupled to its respective bail $B_{1a}$, $B_{1b}$, by a pivotal coupling 23a, 23b mounted on a curved connector strip 24a, 24b fixed to its respective bail; and similarly the end of each piston $P_2$ is connected to its respective bail $B_{2a}$, $B_{2b}$, by a pivotal coupling 25a, 25b mounted on a curved connector strip 26a, 26b fixed to its respective bail $B_{2a}$, $B_{2b}$. The curved connector strips 24a, 24b secured to the two bails $B_{1a}$, $B_{1b}$ are substantially parallel to the two bails $B_{2a}$, $B_{2b}$ but underlie those bails; and similarly the curved connector strips 26a, 26b secured to the two bails $B_{2a}$, $B_{2b}$ are substantially parallel to bails $B_{1a}$, $B_{1b}$, but in between those bails.

The fruit picking head illustrated in FIG. 2 includes a further piston drive Phd 3, which carries the locking bar 10 for moving it into locking or unlocking position with respect to block 12 carried by tube 4.

FIG. 1 illustrates two further pistons $P_{4a}$, $P_{4b}$ for moving tube 4, and the fruit picking head 2, to either an extended or retracted position. For this purpose, the cylinders for the two pistons Phd 4a, Phd 4b are fixed to the outer tube 6, and the pistons for these cylinders are pivotally mounted to the inner tube 4 telescopingly received within the outer tube.

Figure 3:
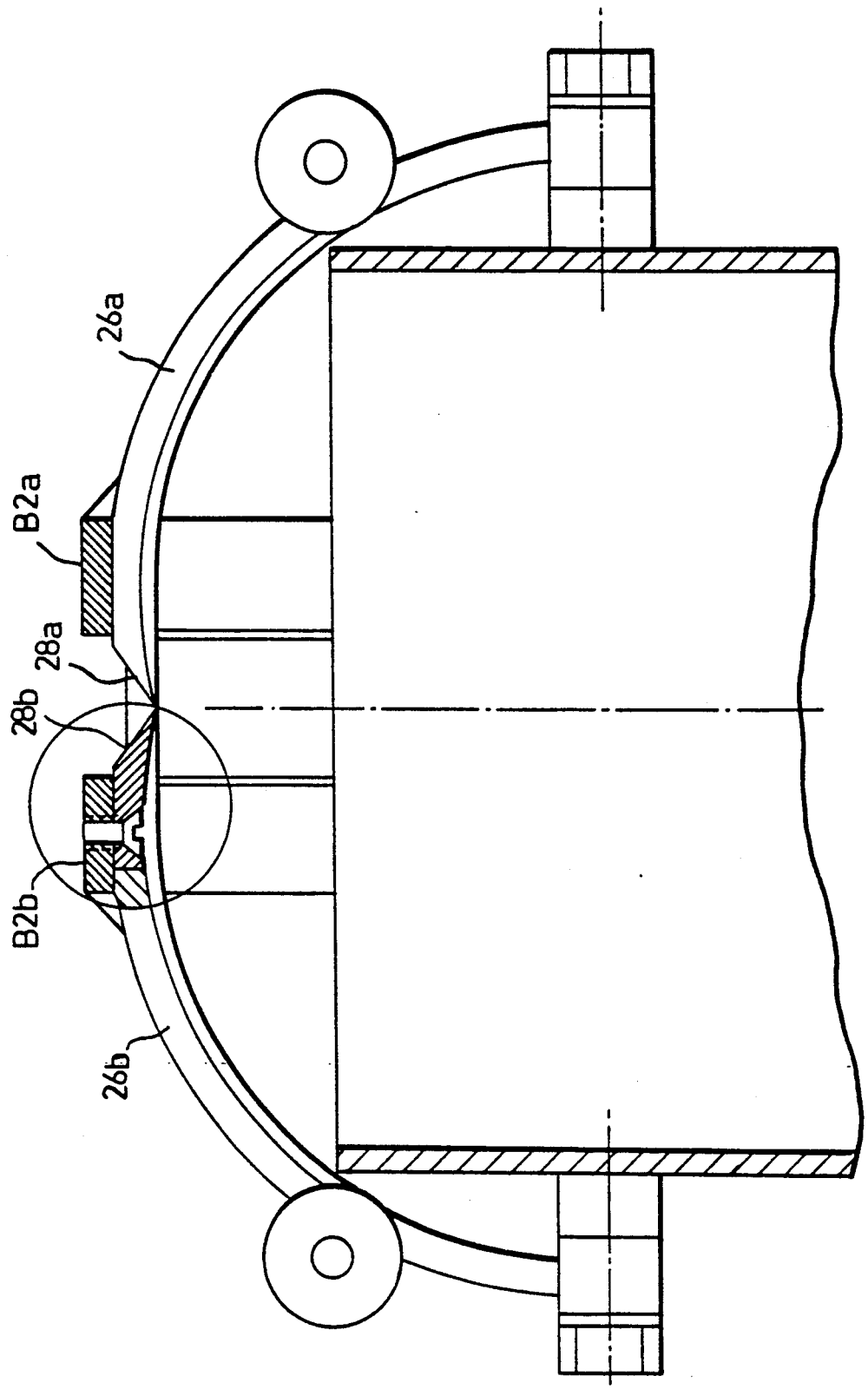
FIG. 3 is an enlarged fragmentary view particularly illustrating the cutting blades in the head of FIG. 2.

As shown particularly in FIG. 3, the two curved connector strips 26a, 26b coupling the pair of bails $B_{2a}$, $B_{2b}$ to their respective piston drives, terminate at their inner ends in sharp cutting edges 28a, 28b, which serve as cutting blades for cutting the fruit stem when bails $B_{2a}$, $B_{2b}$, are moved to their closed positions. The connector strips 24a, 24b joining the two bails $B_{1a}$, $B_{1b}$ to their piston drives, are formed at their inner ends with extensions 29a, 29b, which overlie the cutting blades 28a, 28b, and thereby serving as guiding lips for guiding the movement of the stem into the center of the two cutting blades.

It will be seen from FIGS. 2 and 3 that the two bails $B_{2a}$, $B_{2b}$, carrying the blades 28a, 28b are pivotally mounted to housing 14 at pivot points located on opposite points of, and laterally spaced from, the longitudinal axis of the housing 14 and of its upper opening receiving the fruit. It will therefore be seen that when the bails $B_{2a}$, $B_{2b}$, are pivotted to their closed positions, the cutting edges 28a, 28b of the blades will pass their high points before they come together and will start to descend towards the fruit when they meet the stem, therefore cutting the stem very close to the fruit.

In order to provide some automation to the illustrated fruit picking device, it includes a number of sensors, as follows:

Sensor $S_1$ detects the lower surface of a fruit received within the housing. This sensor is preferably an optical sensor disposed externally of the housing and directing a light beam through openings in the housing to be impinged by the lower surface of a Fruit received within the housing 14. Sensor $S_1$ is effective to actuate the pistons $P_1$ to move their respective bails $B_{1a}$, $B_{1b}$ to their closed positions. It is also effective to actuate piston $P_3$ to release its locking rod 10 from a locking position within block 12.

Sensor $S_2$ is preferably a magnetic sensor located at the upper end of one of the pistons $P_1$. It detects the completion of the pivotal movement of bails $B_{1a}$, $B_{1b}$ to their closed positions, and is effective to actuate pistons Phd 4a, Phd 4b to move tube 4, and its head 2, to a retracted position with respect to the outer tube 6.

Sensor $S_3$ is preferably a magnetic sensor located at the upper end of one of the pistons Phd 4a, Phd 4b. It detects the completion of the retraction of the head 2, at which time it actuates pistons $P_2$ to move the second pair of bails $B_{2a}$, $B_{2b}$ to their closed positions.

Sensor $S_4$, preferably also a magnetic sensor, is located at the upper end of one of the pistons $P_2$. It detects the severing of the fruit from its stem, and actuates a signal, which may be an audio and/or visual, to the operator. It also returns pistons Phd 1, $P_3$ and $P_4$ to their normal positions.

Sensor $S_1$ is also effective to detect that the fruit within the head has been severed from its stem when the fruit falls through the housing. It actuates, at this stage, the pistons $P_2$ to return them, and thereby the pair of bails $B_{2a}$, $B_{2b}$, to their normal open positions.

Figure 4:
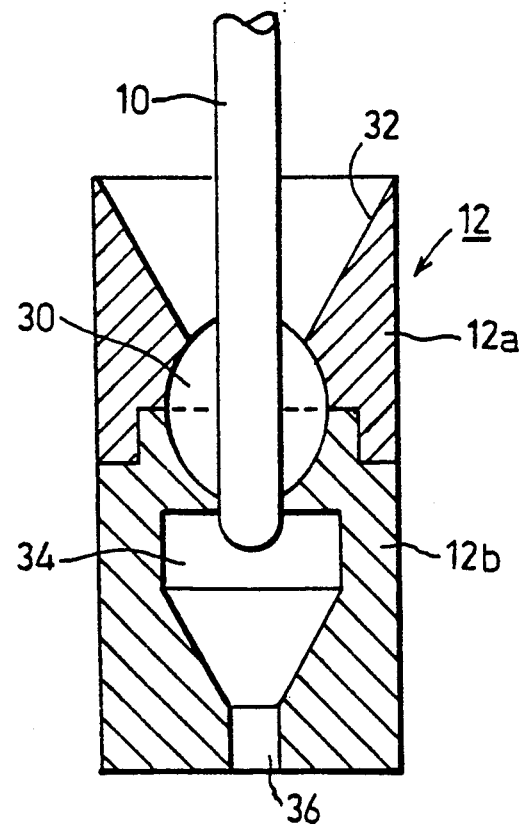
FIG. 4 is an enlarged fragmentary view illustrating the locking means in the head of FIG. 2.

FIG. 4 more particularly illustrates the construction of block 12 which cooperates with locking rod 10 to lock the head 2 against pivotal movement.

As shown in FIG. 4, locking block 12 is formed of two sections 12a, 12b secured together, and defining between them a socket for a ball 30 formed with a central opening slidably receiving the locking rod 10 carried by piston $P_3$ (FIG. 2). Section 12a is formed, at the entrance end of the block with respect to the locking rod 10, with diverging side walls 32 to allow a large pivotal movement of the locking rod, and thereby of head 2 carrying the locking rod. Section 12b of block 12 is formed with another relatively large socket 34 terminating at its opposite end in a socket 36 of substantially the same diameter as locking rod 10, so that when the locking rod is moved into socket section 36, the locking rod, and thereby head 2, are both locked against pivotal movement.

The operation of the device illustrated in FIGS. 1-4 will now be described particularly with reference to the flow chart of FIG. 5.

In the normal position of the device, pistons $P_1$ and $P_2$ are in their lowered positions so that their respective bails $B_{1a}$, $B_{1b}$ and $B_{2a}$, $B_{2b}$ are open, thereby opening the upper end of housing 14 of the fruit picking head 2; pistons $P_3$ are in their lower position, with locking rod 10 seated within the locking socket 36 of the locking block 12, thereby locking head 2 against pivotal movement; and pistons $P_4$ are in their extended positions, so that head 2 is also in its extended position.

Tube 6 of the fruit picking device may then be moved to underlie a fruit (e..g, an orange) to be picked. This is the condition illustrated by box 41 in the flow diagram of FIG. 5. The picking head 2 is then raised until sensor $S_1$ optically detects the lower surface of the fruit within the housing 14 to actuate the sensor (box 42).

When sensor $S_1$ is thus actuated, it actuates pistons $P_1$ to move the bails $B_{1a}$, $B_{1b}$ to their closed positions (box 43). At the same time, sensor $S_1$ L actuates pistons $P_3$ to lift the locking rod 10 out of the locking socket 36 of block 12 (FIG. 4), thereby permitting the picking head 2 to both pivot, and also to move axially, with respect to its tube 4 because of the yielding coupling provided by spring 8 between the picking head and tube 4. L As soon as pistons $P_1$ have completed their upward movement (whereupon their bails $B_{1a}$, $B_{1b}$ are in their closed positions), sensor $S_2$ is actuated by piston $P_1$ (box 45). Sensor $S_2$ actuates pistons Phd 4a, Phd 4b (FIG. 1) to move tube 4 and the picking head 2 downwardly towards tube 6. During this movement, the spring coupling 8 between the picking head 2 and tube 4 permit the picking head to move both laterally and axially, allowing the upper surface of the fruit within the head to engage the undersurface of the bails $B_{1a}$, $B_{1b}$. When sensor $S_3$ is actuated (box 47), it actuates pistons $P_2$ to pivot the second pair of bails $B_{2a}$, $B_{2b}$ to their closed positions, whereupon the cutting blades 28a, 28b cut the stem of the fruit within the housing 14.

As described earlier, because of the eccentric pivotal mounting of the bails $B_{2a}$, $B_{2b}$ and their cutting blades 28a, 28b, with respect to the longitudinal axis of housing 14, the cutting edges of the blades actually start to descend towards the fruit when meeting the stem, thereby cutting the stem very close to the fruit.

When the cutting blades thus cut the fruit stem, sensor $S_4$ on the piston $P_2$ is actuated. Sensor $S_4$ actuates the pistons Phd 1, $P_3$ and Phd 4a, Phd 4b to their normal positions, thereby returning bails $B_{1a}$, $B_{1b}$ to their open positions, returning locking bar 10 to its locking position within the locking socket 36 of the block 12, and returning the head to its extended position (box 48). Actuation of sensor $S_4$ also operates an audio and/or visual signalling device, to signal to the operator (or to a robot, if one is used) that the fruit has been picked, and therefore, the picking head may be moved to another position to pick another fruit.

After the fruit then picked has been severed from the tree, it drops through head 2 and passes via tubes 4 and 6 (and a flexible feeding conduit, not shown) to a collecting receptacle. During the movement of the fruit through the head, it again actuates sensor $S_1$. This normalizes pistons Phd 2, thereby returning the bails $B_{2a}$, $B_{2b}$, back to their open positions, so that the picking head is now in its initial normal condition for receiving and picking another fruit.

While the invention has been described with respect to one preferred embodiment, it will be appreciated that many variations may be made. For example, the fruit picking device may be automated to a degree than that described, e.g., by omitting pistons Phd 4a, Phd 4b actuated by sensor $S_2$ when the first pair of bails $B_{1a}$, $B_{1b}$ are closed, in which case the pull-back of the picking head 2 may be effected manually. In addition, the device may be fully automated, or automated to a greater degree, for example by mounting its outer tube 4 to a robot controlled to move the head back, instead of the pistons Phd 4a, Phd 4b, and then when the fruit has been severed (as sensed by sensor $S_1$) to move the head so as to underlie another fruit after to be picked.

Many other variations, modifications and applications of the invention will be apparent.

What is claimed is:

1. A fruit picking device for picking a fruit suspended by a stem from a plant on which the fruit grows, said fruit picking device comprising:
   a head having an opening at one end larger than the fruit to be picked for receiving the fruit;
   a first pair of bails pivotally mounted to the head in spaced relation to each other across said housing opening and pivotal from an open position allowing the fruit to enter the head, or to a closed position; and a second pair of bails pivotally mounted to the head in spaced relation to each other across said housing opening substantially perpendicularly to said first pair of bails and also pivotal from an open position allowing the fruit to enter the head, or to a closed position.

2. The device according to claim 1, wherein said second pair of bails include cutter blades effective, when the latter bails are pivotted to their closed positions, to engage and cut the stem of the fruit within the head.

3. The device according to claim 2, further including a first sensor effective, when sensing a fruit in a predetermined position within the head, to actuate said first pair of bails to pivot them from their open positions to their closed positions.

4. The device according to claim 1, wherein said head is pivotally mounted to a tube, and includes locking means normally locking the head against pivotal movement, but actuatable to release the head for pivotal movement with respect to said tube.

5. The device according to claim 4, wherein said head is pivotally mounted to said tube by a yieldable coupling which permits both pivotal and axial movement of the head with respect to said tube.

6. The device according to claim 5, wherein said yieldable coupling is a coiled spring.

7. The device according to claim 4, wherein said locking means comprises a locking rod carried by said head receivable in a socket carried by said tube, and a drive for moving said locking rod into said socket to lock the head against pivotal movement with respect to said tube, or out of said socket to release the head for pivotal movement with respect to said tube.

8. The device according to claim 7, wherein said locking means locks the head at an angle of 105-165° with respect to the longitudinal axis of the tube.

9. The device according to claim 7, wherein said locking means further includes a ball pivotally mounted to said tube and formed with an opening receiving the locking rod and normally permitting the locking rod, and the head secured thereto, to pivot with respect to said tube, said locking means drive being effective to move the locking rod through the ball into said socket to lock the head against pivotal movement with respect to said tube.

10. The device according to claim 4, wherein said first sensor is effective, when sensing a fruit within the head, also to actuate said locking means to its released position to permit pivotting the head with respect to said tube.

11. The device according to claim 4, further including a drive for the tube for driving it and the head carried thereby to an extended or retracted position.

12. The device according to claim 11, further including a second sensor effective, upon the actuation of said first pair of bails to their closed positions, to actuate said drive to move the tube to its retracted position.

13. The device according to claim 4, further including a third sensor effective, when the upper surface of the fruit engages the lower surface of said first pair of bails, to actuate said second pair of bails to their closing positions and to cut the stem of the fruit within the head.

14. The device according to claim 13, wherein said second pair of bails are pivotally mounted to the head at pivot points on opposite side of, and laterally spaced from, the longitudinal axis of the opening through the head, such that the cutting edges of the cutting blades, when pivotted to their closed positions, cut the stem close to the fruit.

15. The device according to claim 13, further including a fourth sensor effective, when the second pair of bails have been pivotted to their closed positions, to pivot said first pair of bails to their open positions, to actuate said locking means to lock same against pivotal movement, and to move said tube to its extended position.

16. The device according to claim 15, wherein said first sensor is an optical sensor.

17. The device according to claim 16, wherein said first sensor is also effective, when sensing that the fruit has been separated from its stem, to move said second pair of bails to their open positions.

18. A fruit picking device for picking a fruit suspended from a stem by a plant on which the fruit grows, said fruit picking device comprising:
   a head pivotally mounted to a tube and having an opening at one end larger than the fruit to be picked for receiving the fruit;
   a first bail means pivotally mounted to the head across said housing opening and pivotal from an open position allowing the fruit to enter the head, or to a closed position;
   a second bail means pivotally mounted to the head across said housing opening substantially perpendicularly to said first bail means and also pivotal from an open position allowing the fruit to enter the head, or to a closed position;
   said second bail means including a cutter blade effective, when the second bail means is pivotted to its closed position, to engage and cut the stem of the fruit within the head;
   and locking means normally locking the head against pivotal movement with respect to said tube, but actuatable to release the head for pivotal movement with respect to said tube.

19. The device according to claim 18, wherein said head is pivotally mounted to said tube by a coiled spring coupling which permits both pivotal and axial movement of the head with respect to said tube.

20. The device according to claim 18, wherein said first bail means comprises a pair of bails pivotally mounted to the head in spaced relation to each other; and said second bail means comprises a second pair of bails pivotally mounted to the head in spaced relation to each other substantially perpendicularly to said first pair of bails.

* * * * *